Nov. 22, 1966   JAMES E. WEBB   3,287,660
ADMINISTRATOR OF THE NATIONAL AERONAUTICS
AND SPACE ADMINISTRATION
SOLID STATE CHEMICAL SOURCE FOR AMMONIA BEAM MASER
Filed Jan. 24, 1964
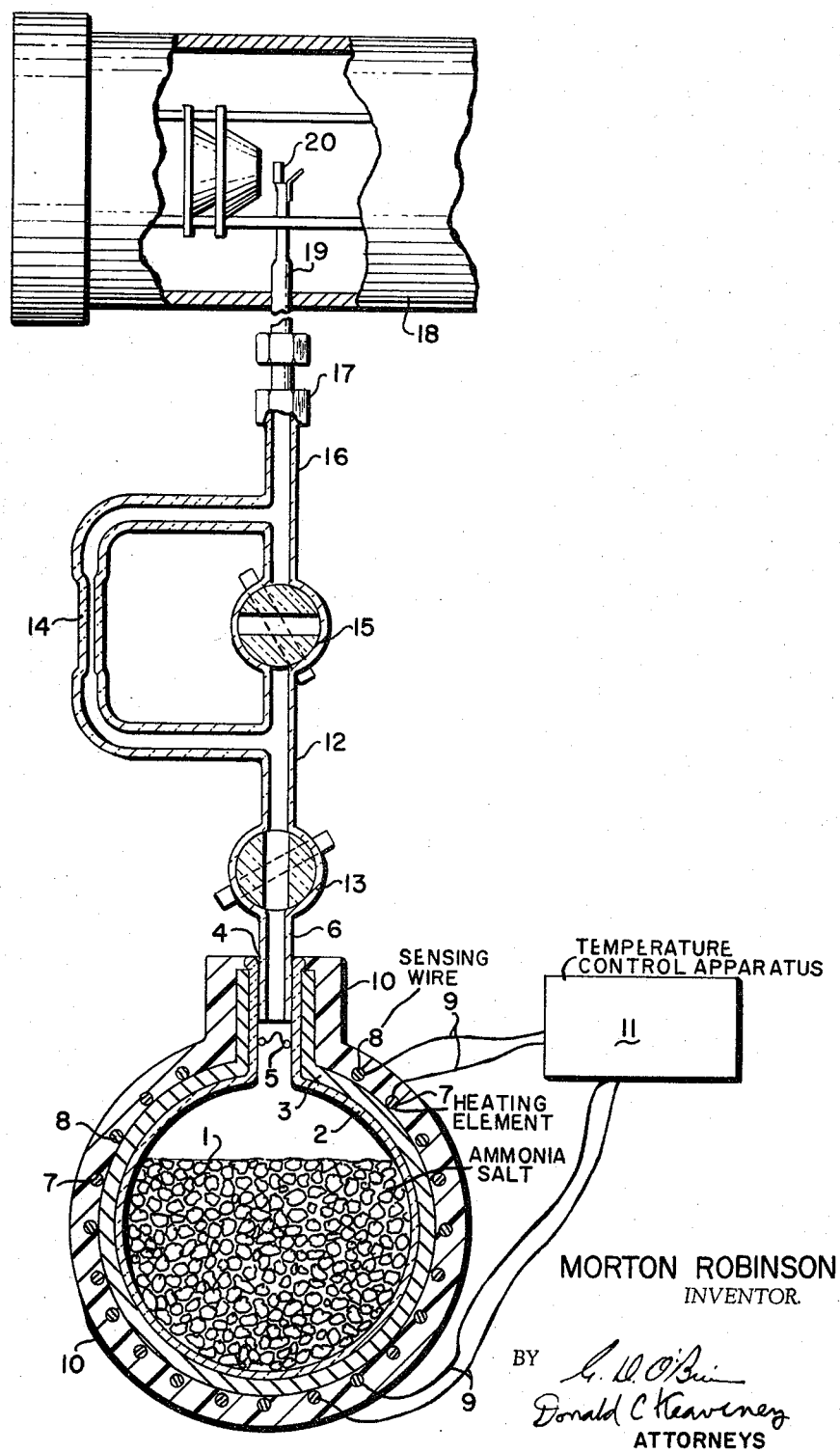
MORTON ROBINSON
INVENTOR.
BY
ATTORNEYS

United States Patent Office 3,287,660
Patented Nov. 22, 1966

3,287,660
SOLID STATE CHEMICAL SOURCE FOR AMMONIA BEAM MASER
James E. Webb, Administrator of the National Aeronautics and Space Administration, with respect to an invention of Morton Robinson
Filed Jan. 24, 1964, Ser. No. 340,113
6 Claims. (Cl. 331—94)

This invention relates to apparatus for generating gaseous ammonia and more particularly to a solid-state source of gaseous anhydrous ammonia for use in ammonia-beam masers or similar apparatus.

Many experiments and technical operations connected with space flights require ultraprecise frequency standards and/or time measuring means. An example of such experiments is the investigation of relativistic phenomena in space flight which requires time measurement of the order of accuracy provided by ammonia-beam masers.

A maser is a device for coherent amplification or generation of electromagnetic waves by use of excitation energy in resonant atomic or molecular systems. The device uses an unstable ensemble of atomic or molecular particles which may be stimulated by an electromagnetic wave to radiate excess energy at the same frequency and phase as the stimulating wave, thus providing coherent amplification. Molecular beam masers are well known in the art. A discussion of the principles of operation can be found in the papers appearing in the Physical Review, volume 99, pages 1264-1274 (Aug. 15, 1955) and the Proceedings of I.R.E., volume 45, pages 291 to 316 (March 1957).

The gas beam-type maser was the first type of maser developed. Its operation requires that a known and controllable quantity of gas be supplied. Heretofore, liquid ammonia sources have been used in ammonia beam masers, but due to their high vapor pressure (typically, nine atmospheres at room temperature) they had to be contained in heavy stainless steel cylinders equipped with elaborate pressure reducing valves. Although there are many mechanical devices which can provide this function, all suffer from the fact that they are heavy and subject to malfunction. In a typical construction ammonia gas obtained from the pressurized tank via pressure reducing regulators issues from a small orifice into a vacuum system to form a molecular beam. Molecules in the lower of the two states are deflected away from the axis of the state sorter or focuser by inhomogeneous electric fields which act on their dipole moments. Those molecules in the upper state are deflected towards the axis and sent into the microwave-resonant cavity. If losses in the cavity walls and coupling holes are sufficiently small, or if the number of molecules is sufficiently large, amplification or oscillation will occur. The ammonia-beam maser is particularly useful as a frequency or time standard because of the relative sharpness and invariance of resonances of the ammonia beam. It is also particularly useful as a frequency standard for satellite and missile tracking systems where weight is a prime consideration in deciding the type of maser to be used.

An ammonia beam maser is also shown and described in Patent No. 3,013,218 entitled Molecular Beam Maser. The present invention provides a novel and improved solid-state source for gaseous anhydrous ammonia which enhances the advantages of a maser as a frequency standard in a satellite or the like. In the present invention ammonia is stored in a form from which it can be slowly released at a controllable rate. The means by which this is done is its conversion to a complex with the salt, silver chloride. Since the latter is a pure compound with a definite equilibrium temperature and pressure, the release of the ammonia is then a predictable and controllable phenomenon. This characteristic is precisely what is required for optimum maser operation.

As mentioned previously, in conventional ammonia-beam masers the amount of ammonia in the apparatus is regulated by an external source of ammonia which typically comprises a tank of liquified ammonia under pressure, the associated valves, gages, pumps, and fittings or similar apparatus as known in the art. In a satellite or missile tracking system, where the vehicle may be continuously tumbling and spinning, a liquid ammonia source must be ruled out, since the gas cannot be physically separated from the liquid; to insure constancy of flow the gas phase must at all times be in contact with the flow regulating mechanism. However, the solid ammoniate of the present invention overcomes this difficulty since it can be separated from its vapor by simply covering it with a screen whose openings are smaller than the particle size of the solid.

Since the decomposition mechanism of the complex salt, silver chloride-monoammoniate can be accurately predicted, it may be used in accordance with the invention to overcome the objection of prior devices. The novel technique of the present invention is automatic in the sense that it is based upon a chemical reaction rate which is fixed.

It is therefore a principal object of the invention to provide novel means and apparatus whereby ammonia is stored in a form from which it can be readily released at a controllable rate.

Another object of the invention is to provide a novel method and means for conversion of ammonia to a silver chloride complex salt and the subsequent liberation of gaseous ammonia therefrom.

Another object of the invention is to provide a novel and improved source of gaseous ammonia for ammonia-beam masers or the like.

Still another object of the invention is to provide a source of ammonia for masers which is lighter in weight, more reliable, and less complex than sources used heretofore.

Still another object of the invention is to provide a novel source of gaseous ammonia for ammonia-beam masers or the like which may be operated in any position and which will operate within a moving vehicle.

A general object of the invention is to provide a novel and improved solid-state chemical source for gaseous ammonia which overcomes disadvantages of previous means and methods heretofore intended to accomplish generally similar purposes.

The features of this invention which are believed to be novel are set forth with particularlity in the appended claims. The present invention itself, both as to its organization and manner of operation, together with further objects and advantages thereof may best be understood by reference to the following description taken in conjunction with the drawing which shows a typical construction of a solid-state chemical source as may be used in an ammonia-beam maser.

The complex salt, silver chloride-monoammoniate, is prepared in a glass-lined copper sphere and is indicated at 1 in the drawing. The sphere, comprising glass lining 2 and copper jacket 3, will be referred to hereinafter as the reservoir. An insulating outer jacket 10 of suitable composition may be provided, as will be apparent to those versed in the art. The reservoir is provided with an opening 4 by means of which the salt 1 may be introduced and through which the gaseous ammonia may escape. Opening 4 may be provided with a screen 5 having a finer mesh than the particle size of salt 1 thereby preventing salt particles from entering conduit 6 and other parts of the system. The reservoir is wrapped with an electric heating element 7 and a thermostat sensing wire 8 of any suitable and well-known construction. The sensing wire 8 constitutes one arm of a Wheatstone bridge. The bridge circuit controls the power input to the heating element, in a well-known manner, whereby the temperature can be kept constant to ±0.04° C. Interconnecting cable 9 couples element 7 and sensing wire 8 to the external temperature control apparatus 11 containing the bridge circuit and input power source.

Conduit 6 is coupled to manifold 12 via stopcock 13. Capillary 14 and capillary bypass stopcock 15 are connected to manifolds 12 and 16. Leak-tight fitting 17 permits the above-described apparatus to be attached to, or removed from, the ancillary apparatus. During preparation of the salt 1, the apparatus may be connected to a source of gaseous ammonia whereby ammonia is added to the silver chloride to form the complex salt $AgCl \cdot NH_3$. As is known to those versed in the art, if anhydrous ammonia is added to many salts at low temperatures, compounds containing several molecules of ammonia are formed. When warmed, these complex salts lose ammonia at a rate which is dependent on temperature. In the present invention, the salt silver-chloride is used and molecules of ammonia added thereto. Silver chloride-monoammoniate ($AgCl \cdot NH_3$) is a solid compound formed by the chemical combination of the anhydrous silver chloride (AgCl) with the gaseous anhydrous ammonia ($NH_3$):

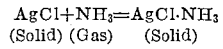
$$AgCl + NH_3 = AgCl \cdot NH_3$$
(Solid) (Gas) (Solid)

When the silver chloride is nearly 100% ammoniated, stopcock 13 is closed to isolate the source from the atmosphere.

The apparatus is fitted with capillary 14 which is designed to give a flow of $10^{17}$ molecules per second at a given ammonia back pressure. The apparatus is now attached to the maser beam chamber 18 by means of a leak-tight fitting 17 which mates with conduit 19. After attachment the apparatus is evacuated, keeping the isolating stopcock 13 closed and stopcock 15 open. Bypass stopcock 15, which is opened during preparation of the source, is closed prior to operation of the apparatus. The reservoir is allowed to come to a predetermined temperature corresponding to the temperature calculated to give the proper beam flux for maximum power output, the isolating stopcock 13 is opened and immediately a maser signal may be obtained. Gas flow into chamber 18 is via conduit 19 and nozzle 20. The high resistance of capillary passage 19 prevents any substantial change in the flow of gaseous ammonia to nozzle 20 due to changes in ambient temperature with the result that a highly stable ammonia beam is formed and is maintained until all of the ammonia in the reservoir is expended.

One mole of $AgCl \cdot NH_3$ weighing 161 grams can release enough ammonia at a constant beam flux of $10^{17}$ molecule seconds $^{-1}$ to operate an ammonia beam maser for 70 days, and because of its low vapor pressure it can be kept in a simple, light-weight container such as the above-described reservoir. This low molecular weight-low vapor pressure system when provided with temperature controls and coupled to a simple capillary exhibits all of the characteristics of an excellent solid state source for ammonia beam masers.

In the above description silver chloride-monoammoniate has been described as the preferred ammoniate. However, other solid state ammoniates may be used. For example, ammonium salts of acids in the solid state dissociate readily into ammonia and the free acid. If the solid state ammoniate is heated in a closed vessel, a definite pressure of ammonia is established in the presence of the solid salt. This pressure is determined solely by the temperature and, if the acid or metal salt is nonvolatile, is called the dissociation pressure at that temperature.

From the foregoing it can be seen that massive, pressurized, sources of liquified ammonia are obviated during inflight operation of ammonia beam masers in satellites and space vehicles. The pressure of the ammoniate system in the present invention is approximately equal to $\frac{1}{10}$ atmosphere at room temperature and remains constant at a given temperature as long as two phases are present. Therefore, the beam flow into the master chamber remains constant until all of the ammonia is expended.

While there have been shown and described and pointed out the fundamental novel features of the invention as applied to a preferred embodiment, it will be understood that various omissions, substitutions, and changes in the form and details of the device illustrated and in its operation may be made by those skilled in the art, without departing from the spirit of the invention; therefore, it is intended that the invention be limited only as indicated by the scope of the following claims.

What is claimed is:

1. A solid state chemical source for an ammonia beam maser comprising:
   a reservoir containing an ammonia salt;
   passage means connecting said reservoir to said maser; and
   means for regulating the temperature of said reservoir at a predetermined level thereby causing said salt to dissociate and liberate gaseous ammonia through said passage means at a predetermined pressure proportional to the temperature of said reservoir.

2. A solid state chemical source as defined in claim 1 wherein said salt comprises:
   solid particles of silver chloride-monoammoniate.

3. A solid state source as defined in claim 2 having screen means interposed in said passage means for retaining said silver chloride-monoammoniate in said reservoir while allowing escape of said gaseous ammonia.

4. A solid state source as defined in claim 2 having capillary means connected between said reservoir and said passage means for maintaining a given flow rate of said gaseous ammonia into said maser at a given ammonia dissociation pressure.

5. A solid state chemical source as defined in claim 2 wherein said temperature regulating means comprises:
   an electric heating element substantially surrounding said reservoir; and
   temperature sensing means disposed on said reservoir and responsive to changes in temperature thereof to control the supply of electric power to said heating element.

6. A solid state chemical source for an ammonia beam maser comprising:
   a reservoir containing a solid ammoniate;
   a conduit connected to said reservoir through which gaseous ammonia may flow;
   an inlet passage having a leak-tight fitting attached thereto whereby said source may be connected first to a supply of ammonia and thereafter to said maser;
   isolating valve means interposed between said inlet passage and said conduit whereby ammonia may be introduced from said supply during ammoniation of said ammoniate and whereby ammonia may be discharged to said maser during dissociation of said ammoniate; and
   means for elevating the temperature of said reservoir to a temperature sufficient to cause dissociation of said ammoniate when said source is connected to said maser.

References Cited by the Examiner

UNITED STATES PATENTS

| | | | |
|---|---|---|---|
| 2,260,840 | 10/1941 | Rowe | 219—514 X |
| 3,117,837 | 1/1964 | Hasse | 23—193 X |
| 3,214,630 | 10/1965 | Helmer et al. | 330—4 X |

OTHER REFERENCES

Mellor, A Comprehensive Treatise on Inorganic and Theoretical Chemistry, vol. III, Longmans, Green and Co., N.Y., 1946, page 400.

ROY LAKE, *Primary Examiner.*

S. H. GRIMM, *Acting Examiner.*